Patented May 11, 1926.

1,584,130

UNITED STATES PATENT OFFICE.

EDWARD LLOYD PEASE, OF DARLINGTON, ENGLAND.

PROCESS OF MAKING A FERTILIZER.

No Drawing.  Application filed April 1, 1922. Serial No. 548,880.

The present invention has for its object to produce in a simple, economical and more advantageous manner than heretofore from base materials which are themselves not manures as commonly understood but which may contain manurial ingredients and which are not composed of or do not contain much lime compounds, material containing an ammonia compound or compounds and a secondary fertilizing agent or agents each disseminated throughout the mass of the said material, so that the latter can advantageously and economically be used as a fertilizer.

For this purpose, an acid, as for example sulphuric acid, or the equivalent thereof, such as sulphuric anhydride or sulphurous anhydride, or hydrochloric acid, or phosphoric acid, or waste acid, as for instance, spent pickling acid, or an acid salt, as for instance, hydric sodic sulphate, that is to say, nitre cake, or it may be a mixture of two or more or all of such acids, is caused to come into intimate contact with base or raw material that is free from or low in calcium compound, is of an absorbent nature or which can be rendered absorbent, as by heating, and which contains a valuable secondary fertilizing product or products such as a salt of potassium, or a phosphate, so as to form a semi-dry compound or compounds or both a compound or compounds and free acid, constituting absorbing material capable of reacting with ammonia or ammonia compounds (hereinafter included in the term ammonia) present in air or other gases or vapors which are brought into intimate contact therewith, so as to form a product containing compounds of a valuable character, depending upon the nature of the absorbent material used, but including sulphate, chloride, phosphate or other compound of ammonia, or a mixture of two or more ammonia compounds, and a secondary fertilizing agent or agents. In this way there can be obtained in a simple, economical, and convenient manner, fertilizing material comprising one or more compounds of ammonia and, in addition, secondary fertilizing material, derived from or present in the absorbent material used, as for example a salt of potassium, or a phosphate, or both, the ammonia compound or compounds and secondary fertilizing agent or agents being thoroughly disseminated throughout the material which can advantageously be employed directly as fertilizing material.

In this way, the cost of the acid or acids used in producing the compound or compounds of ammonia will be largely compensated for by the value of the additional fertilizing agent or agents obtained.

The invention can be carried into effect in various ways as will be understood from the following examples, the acid used, or its equivalent, being, for the sake of brevity, referred to as sulphuric acid.

Thus, raw material of an absorbent character and containing a substance adapted to be used as a fertilizer, may be treated with sulphuric acid, sufficient in quantity to constitute a semi-dry material and to form therewith a chemical compound or compounds, or a mechanical mixture, or both a chemical compound or compounds and a mechanical mixture, that will, upon bringing the same into intimate contact with gases containing ammonia, act in an efficient manner to extract the ammonia from the gases and, by reaction therewith, to convert the ammonia into a readily available condition and form a valuable product capable of being economically utilized as fertilizing material. The material to which the acid is added to form the ammonia absorbing agent according to this process, contains a valuable secondary fertilizing agent, such as a salt of potassium, or a phosphate, or both, which, by the action of the acid, is rendered soluble and thus made available as a fertilizer. If desirable, the amount of such secondary fertilizing agent contained in the absorbent material may be increased by the direct addition of such fertilizing agent either water soluble or otherwise. Thus, for example, the potassium content may be increased by addition of say potassium chloride, or again, a phosphate may be introduced, particularly in the form of aluminium or iron phosphate, which phosphate would be rendered soluble by the action of the added acid. Phosphate of lime should however be avoided as far as possible for the reason that although ammonia would combine with any phosphoric acid that might be produced, to form phosphate of ammonia, the latter would react with the sulphate of calcium present to form sulphate of ammonia and phosphate of lime so that the phosphorus would not ultimately be converted into the form of a soluble phosphate as is desirable when the product is to be used as fertilizing material. Semi-dry material such as referred to, suitably for the purpose set forth, can be produced in various ways.

In one case, the raw material may contain a compound of potassium which is rendered available as a fertilizer in the finished product. In another case the raw material may contain phosphorus in the form say of a phosphate other than a phosphate of calcium which by the action of the acid may be rendered soluble and of use as a fertilizer. In a third case the material may contain nitrogen, as for example peat in which case by digestion with the acid a portion at least of the nitrogen is rendered soluble.

For example, material suitable for use as a fertilizing material can be produced by adding to certain kinds of clay, which contain a compound of potassium and which may have been previously dried and pulverized, sulphuric acid, in a more or less concentrated form, sufficient in quantity to combine with the alumina and iron present in the clay and form sulphate of aluminium and sulphate of iron, and also, it may be, to leave an excess of free acid held mechanically in the clay whilst leaving the latter in a suitable physical condition for use. Absorbent material thus produced, forms an extracting and fixing agent for ammonia, having a capacity regulated by the amount of sulphates of aluminium and iron present therein, and also by the amount of free acid, if any, present therein. The sulphates of aluminium and iron re-act with ammonia, in known way, forming sulphate of ammonia, alumina and oxide of iron. The potassium compound present in the absorbent material, used, will, at the same time, be rendered soluble.

For extracting ammonia from gases and fixing the same, the acid treated or absorbent material, is brought into intimate contact with the gases in a suitable apparatus. For instance, the gases to be treated may be caused to flow upward through an inclined tube or conduit through which the semi-dry material, in a more or less broken up or granulated condition, is caused to descend and come into intimate contact with the gases. The ammonia will be extracted from the gases and fixed, the remaining gases flowing away free from ammonia. The ammonia will be converted by reaction with the sulphates, and free acid, if any be present, into sulphate of ammonia which will remain in the resulting product together with a soluble compound of potassium, present in the material.

The product thus obtained is then ready for use as a fertilizing agent or for utilization in some other way.

The product resulting from the treatment of the said semi-dry absorbent material with gases containing ammonia, may be retorted at a low temperature, say about 400° C., whereby it is found that approximately 50% of the ammonia present therein will be evolved as gaseous ammonia, the remaining solid product being left in a suitable condition for re-use as an ammonia extracting and fixing agent to the extent of about 50% of its original activity, when re-introduced into the tube or other ammonia absorbing device, with or without a further addition thereto of acid. Or it may be used as a fertilizer or for other purposes.

When it is not required continually to re-use the treated product, or to dispose of the product, as such, after discharge from the ammonia absorbing apparatus, it can be suitably treated with lime for removal of the ammonia therefrom and the remaining product further treated, if desired, in any suitable way.

Or the product obtained after using the semi-dry material for extracting ammonia from gases, may be leached with water to dissolve out the sulphate of ammonia and other soluble salt, such as for example a potassium sulphate, or salts, formed therein. In this case it is important that if sulphate of iron be present in the said material, the whole of it should have been converted by ammonia into oxide of iron and sulphate of ammonia, otherwise the solution of sulphate of ammonia obtained by leaching the said product may be discolored. The resulting product containing, it may be, oxide of iron, or oxide of iron and oxide of alumina, or other substances, can then be treated in any known or suitable way for the utilization of such substance or substances.

As an absorbent material for the acid used, there may also be used, shales containing alumina, iron, sulphur, and potash, with or without phosphorus, in varying proportions.

Instead of treating the absorbent material used, with liquid sulphuric acid, as herein described, it may, in some cases, be treated with sulphur trioxide vapor or other acid gases or vapors which will act to acidify the material and form a compound therewith.

As an absorbent material, there may also be employed a solution containing an acid and iron, as for instance spent hydrochloric acid or pickling liquor containing free hydrochloric acid, added to a dry raw or base material such as one or other of those hereinbefore mentioned, containing a secondary fertilizing agent or agents and to which may be added, if desired, sulphuric acid, for producing the required semi-dry ammonia extracting and fixing material.

Also, instead of using sulphuric acid, or hydrochloric acid, or its or their equivalent or equivalents in the manner hereinbefore described, phosphoric acid or its equivalent may advantageously be used. In this case, mono- and di-ammonium ortho-phosphoric acid may be produced by suitably treating naturally produced substances containing phosphorus.

As an example of a naturally produced substance containing phosphorus, there may be mentioned phosphate rock consisting of phosphate of lime. In this case the phosphate rock may advantageously be treated with sufficient sulphuric acid in known way to produce ortho-phosphoric acid and calcium sulphate, according to the following formula:—

$$Ca_3(PO_4)_2 + 3H_2SO_4 = 2H_3PO_4 + 3CaSO_4$$

The phosphoric acid thus produced, is separated from the sulphate of lime and combined with or absorbed by other material, for instance shale, peat, clay or other suitable material containing also a potassium compound, nitrogen compound or a phosphate, or a mixture of such materials, artificially added thereto or originally existing therein and the product used in the manner hereinbefore described for extracting ammonia from gases and forming phosphate of ammonia and other product or products.

In this way there can be obtained material containing a tri-ammonium phosphate produced according to the following formula:—

$$2H_3PO_4 + 6NH_3 = 2(NH_4)_3PO_4$$

This salt is basic, which, for many uses, is important. To obtain such basic salt, the absorption of ammonia by the acidified base material should be prolonged and carried out in the cold, say at ordinary atmospheric temperatures. The ammonia is then absorbed in three stages, the first stage resulting in the production of mono-ammonium phosphate $$NH_4H_2PO_4,$$

which is an acid salt, the second stage results in the production of di-ammonia phosphate $(NH_4)_2HPO_4$, which is a neutral salt, and the third stage in the production of the tri-ammonium phosphate above referred to, which is a basic salt.

This salt, when present in other material serving as a base material, if not perfectly dry, retains its ammonia constituent in an effective manner, even on exposure to the air.

As phosphate of ammonia is stable at a considerable temperature, dry absorbent material containing phosphoric acid can, if desired, be used for the treatment of gases that are in a heated condition. This is of importance where for instance it is desired to extract ammonia from combustible gas on its way from a gas producer to a steel melting or other furnace or device and it is important that the gas should not be deprived of its sensible heat before combustion thereof. In this case, mono- and di-ammonium phosphate will be produced. The necessity with other methods, of cooling the gases obtained from producer and like furnaces before extracting ammonia therefrom, has prevented such methods being economically adopted.

As will be obvious, ammonia absorbing material prepared in any of the ways hereinbefore described, can be used for absorbing pure ammonia, such for example as may be evolved by heating an ammonia or other nitrogen compound or compounds. Such pure ammonia is to be understood as included in the term, gases containing ammonia, herein used.

The mixing of the base or raw material with acid, whether sulphuric, hydrochloric, phosphoric, nitric or its or their equivalents, need not necessarily be carried out before the resulting absorbent material is used as an absorbent of ammonia as it may be done in the vessel or vessels in which the ammonia is absorbed, at the same time as the absorption is taking place.

A further example of a base or raw material which may be used is peat which, as is usual, contains nitrogen. The peat is mixed and digested with sulphuric or phosphoric acid and the semi-dry product used to absorb ammonia. The finished material contains not only soluble ammonia compounds to the extent of the ammonia absorbed but also a portion at least of the nitrogen contained in the peat originally which is rendered soluble in the form of an ammonium salt. Or instead of peat or organic material may be used, for example, fine coke, containing as a secondary fertilizing agent or agents, a potassium compound or a nitrogen compound, or both, may be used as base material that is treated with sulphuric, phosphoric or other acid to form absorbent material.

If it is desired to increase the amount of secondary fertilizing material present in the raw material used, this may be done artificially by the direct addition of a compound of such material. For example, if the raw material is a clay containing potash and which is to be treated with phosphoric acid and subsequently with ammonia, thus making a fertilizer containing potash, nitrogen and phosphorus, and if it is desired to raise the percentage of potash in the finished material, this may be accomplished by the direct addition of a potassium salt or compound, which may be either soluble or insoluble in water, to the clay used. As a further example, if it be desired to make from a peat such as referred to above, or fine coke, a fertilizer containing compounds of nitrogen, phosphorus and potassium, this may be accomplished by adding to the peat or coke and intimately mixing therewith, a potassium compound, or material rich in a potassium compound, treating with phosphoric acid and using this material to absorb ammonia in the manner hereinbefore described.

In each case the compound of ammonia and the secondary fertilizing agent or agents present in the material obtained, will be effectually disseminated throughout the mass of such material. The presence of lime, as such, or as superphosphate or other phosphate of lime in the raw or base material used, is preferably avoided as far as possible, particularly in cases where the acid present in the absorbent material is added acid and is not naturally present in the raw or base material, in order to reduce the amount of acid necessary for economically carrying out the invention.

What I claim is:—

1. The process of producing material free from or low in calcium compounds and containing an ammonium compound and a secondary fertilizing material disseminated throughout the mass of said material, which consists in bringing semi-dry absorbent material free from or low in calcium compound and containing a chemical compound capable of interacting with ammonia, and a secondary fertilizing material, into intimate contact with gaseous ammonia, substantially as described.

2. The process of producing material free from or low in calcium compounds and containing an ammonium compound and a secondary fertilizing material disseminated throughout the mass of said material, which consists in bringing semi-dry absorbent material free from or low in calcium compounds and containing a salt and free acid capable of interacting with ammonia, and a secondary fertilizing material, into intimate contact with gaseous ammonia, substantially as described.

3. The process of producing material free from or low in calcium compounds and containing an ammonium compound and a secondary fertilizing material, which consists in bringing acid and absorbent material free from or low in calcium compounds and with which the acid will form a semi-dry absorbent material capable of reacting with ammonia, and containing a secondary fertilizing material, into intimate contact with gaseous ammonia, substantially as described for the purpose set forth.

4. The process of producing material free from or low in calcium compounds and containing an ammonium compound and a secondary fertilizing material, which consists in bringing acid and absorbent material free from or low in calcium compounds and with which the acid will form a semi-dry and absorbent material capable of reacting with ammonia, and containing as a secondary fertilizing material, a potassium compound, into intimate contact with gaseous ammonia, substantially as described for the purpose set forth.

5. The process of producing material free from or low in calcium compounds and containing an ammonium compound and a secondary fertilizing material which consists in treating material of an absorbent character, free from or low in calcium compounds and containing a secondary fertilizing material, with acid sufficient in quantity to constitute a semi-dry absorbent material and to form therewith a chemical compound that will react with ammonia, and bringing the said absorbent material into intimate contact with gases containing ammonia, substantially as described.

6. The process of producing material free from or low in calcium compounds and containing an ammonium compound and a secondary fertilizing material, which consists in treating material of an absorbent character, free from or low in calcium compounds and containing a secondary fertilizing material, with acid sufficient in quantity to constitute a semi-dry absorbent material and to form therewith a chemical compound containing free acid, and bringing the said absorbent material into intimate contact with gases containing ammonia, substantially as described.

7. The process of producing material free from or low in calcium and containing a phosphate of ammonia and secondary fertilizing material, which consists in treating absorbent material free from or low in calcium compounds and containing a secondary fertilizing material with phosphoric acid sufficient in quantity to form a semi-dry material and bringing such semi-dry material into intimate contact with gaseous ammonia.

8. The process of producing a fertilizing material free from or low in calcium compounds and containing an ammonium compound and a secondary fertilizing material, which consists in treating organic material of an absorbent nature forming a base material with acid liquid sufficient in quantity to form with such base material, semi-dry absorbent material, and bringing the resulting product into intimate contact with gases containing ammonia, substantially as described for the purpose set forth.

9. The process of producing material suitable for use as a fertilizer, which consists in impregnating porous absorbent material free from or low in calcium compounds and comprising carbonaceous material with acid comprising phosphoric acid and bringing the resulting product into intimate contact with gaseous ammonia.

10. The process of producing material suitable for use in a fertilizer, which consists in impregnating porous absorbent material free from or low in calcium compounds and comprising peat, with acid comprising phosphoric acid and bringing the resulting product into intimate contact with gaseous ammonia.

11. The process of producing material suitable for use as a fertilizer, which consists in treating phosphate material with sufficient sulphuric acid to form ortho-phosphoric acid and a sulphate of the base present in the phosphate material, separating the resulting solution of ortho-phosphoric acid from any insoluble matter present, treating absorbent material free from or low in calcium compounds with the resulting acid solution to form a semi-dry absorbent material and bringing such absorbent material into intimate contact with gases containing ammonia so that the ammonia will be absorbed thereby to form phosphate of ammonia.

12. A process according to claim 13, wherein the absorption of ammonia by the acid treated porous absorbent material is effected slowly and in the cold so that the ammonia product obtained in the resulting material consists principally of tri-ammonium phosphate.

13. The process of producing material suitable for use as a fertilizer, which consists in impregnating porous absorbent material free from or low in calcium compounds and comprising peat, with ortho-phosphoric acid and bringing the resulting product into intimate contact with gases containing ammonia, the absorption of the ammonia by the acid treated product being caused to take place slowly and in the cold.

14. As a new composition of matter, fertilizing material free from or low in calcium compounds and comprising compounds of ammonia, phosphorus and potassium, disseminated throughout the mass of the said material, substantially as described.

15. As a new composition of matter, fertilizing material free from or low in calcium compounds and containing tri-ammonium phosphate and a potassium compound disseminated throughout the mass of the said material, substantially as described.

Signed at London, England, this twenty-third day of March, 1922.

EDWARD LLOYD PEASE.